(12) United States Patent
Jernström

(10) Patent No.: US 6,547,282 B2
(45) Date of Patent: Apr. 15, 2003

(54) SAFETY BELT PRETENSIONER

(75) Inventor: Clas Jernström, Askim (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 09/682,751

(22) Filed: Oct. 12, 2001

(65) Prior Publication Data

US 2002/0056983 A1 May 16, 2002

(30) Foreign Application Priority Data

Oct. 12, 2000 (SE) .............................................. 0003681

(51) Int. Cl.[7] .............................................. B60R 22/36
(52) U.S. Cl. ........................ 280/806; 180/273; 297/480
(58) Field of Search .............................. 280/807, 806, 280/808; 297/480, 475, 476, 477, 478; 180/268, 273; 188/374

(56) References Cited

U.S. PATENT DOCUMENTS 5,871,236 A * 2/1999 Bauer et al. ................ 280/806
5,873,599 A * 2/1999 Bauer et al. ................ 280/806
6,039,353 A * 3/2000 Bauer et al. ................ 280/806

* cited by examiner

Primary Examiner—Paul N. Dickson
Assistant Examiner—Faye M. Fleming
(74) Attorney, Agent, or Firm—Howrey, Simon, Arnold & White LLP

(57) ABSTRACT

A belt pretensioner in a vehicle, having a piston-cylinder device with a cylinder chamber containing an explosive charge. The piston has a piston rod that projects out of the cylinder on the side of the piston opposite to the cylinder chamber with the explosive charge, and is joined to a cable that drives, via a drum and a planetary gear set, a belt reel mechanism in the winding-up direction when the explosive charge is detonated. The cylinder chamber has an evacuation opening that communicates with a spill valve controlled by an electronic control unit in response to a sensor, which senses the weight of the occupant.

8 Claims, 5 Drawing Sheets

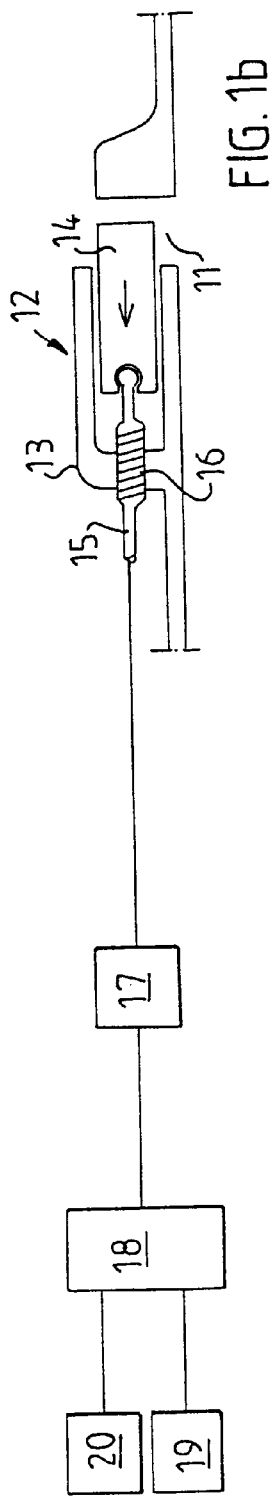
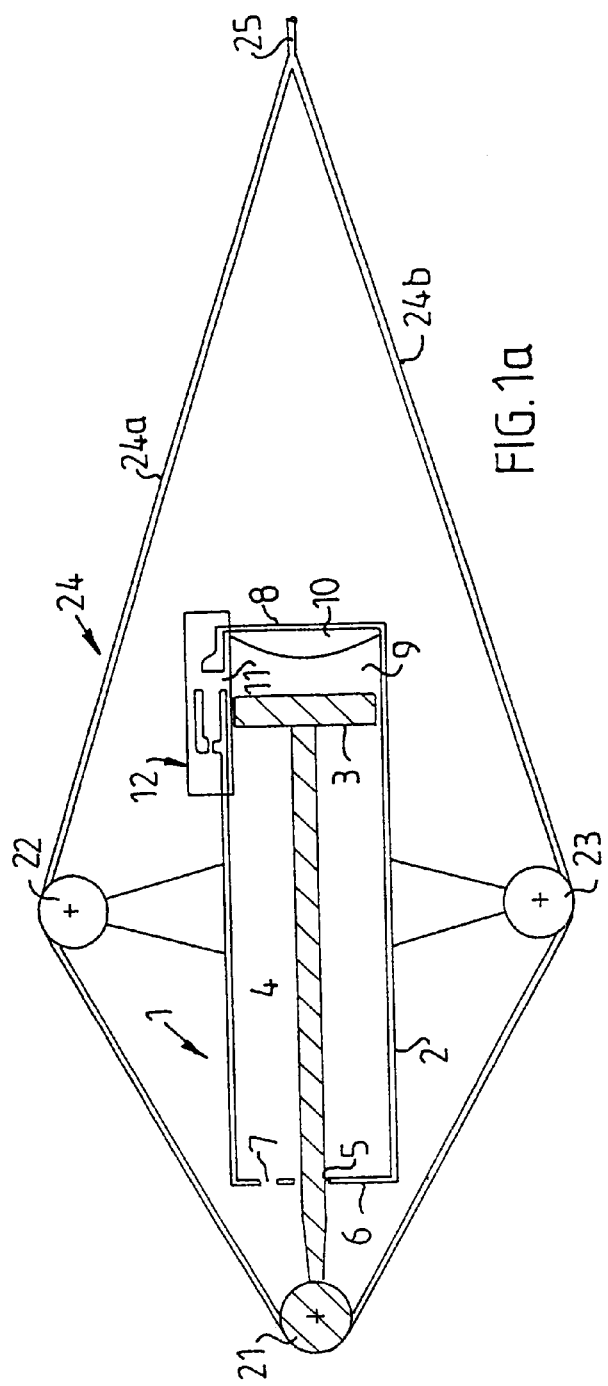

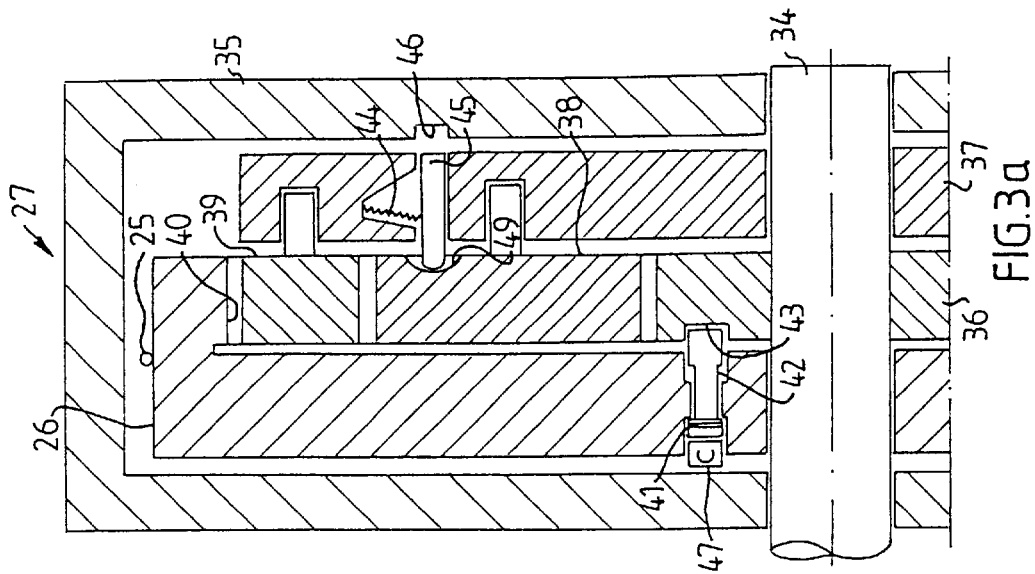
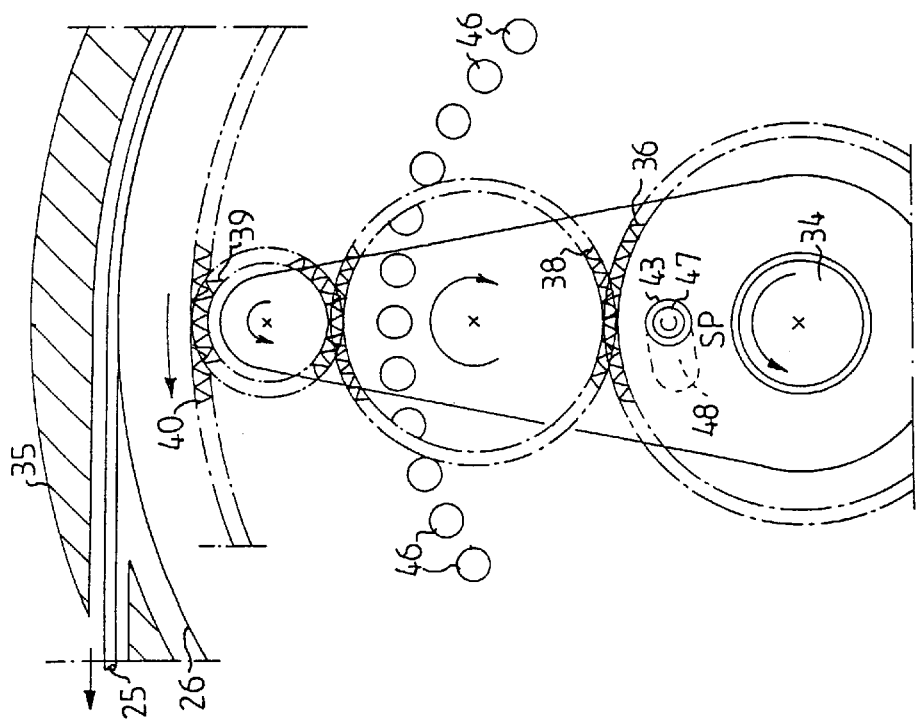

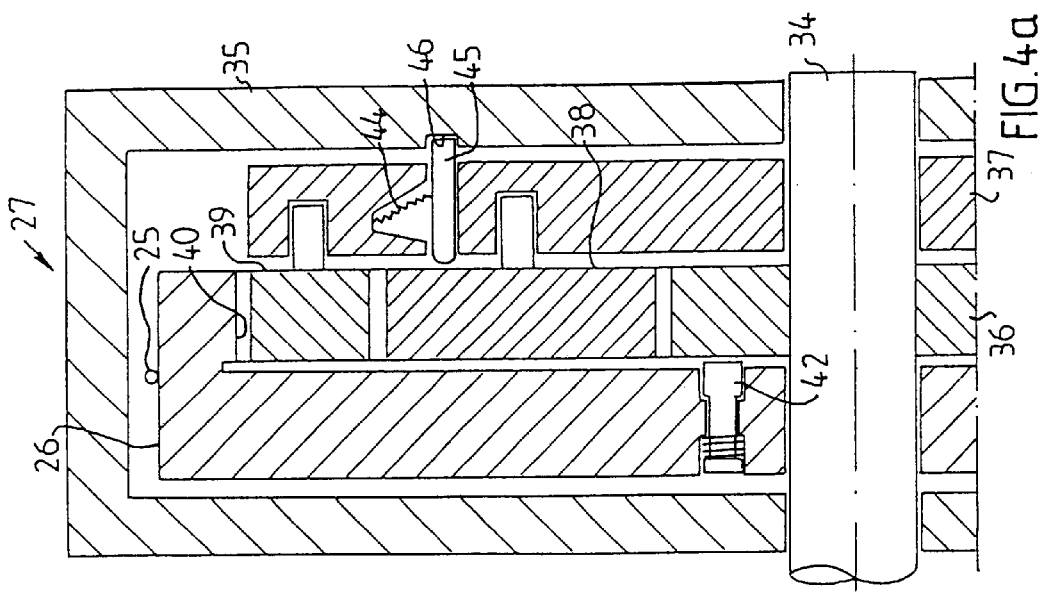
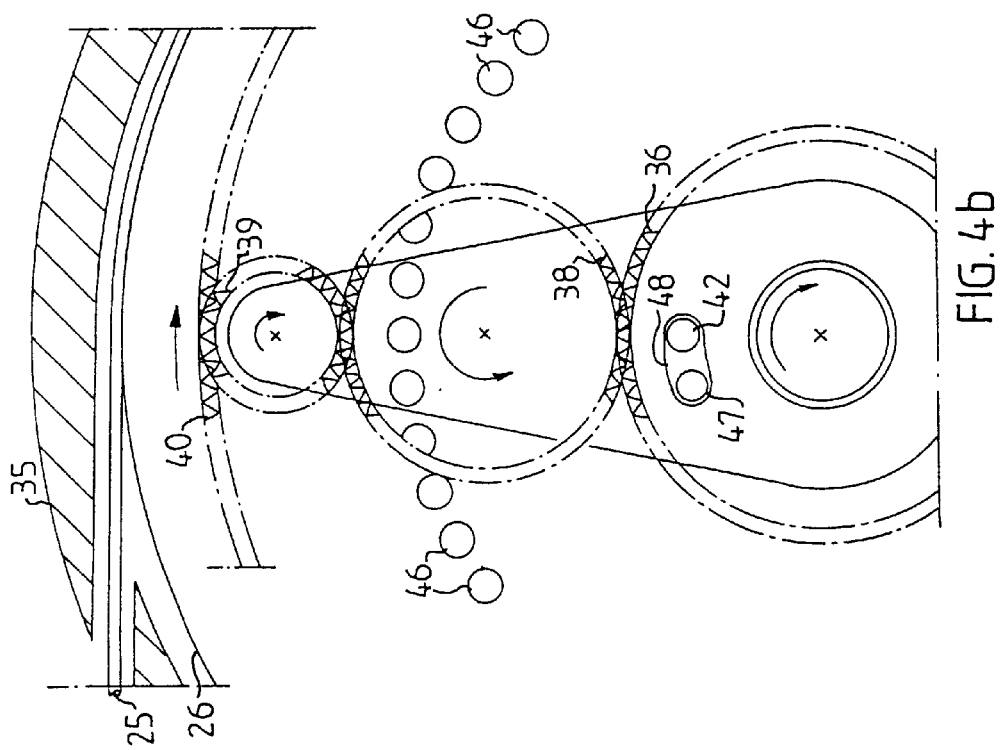

SAFETY BELT PRETENSIONER

CROSS REFERENCE TO RELATED APPLICATIONS

This application claims priority to Swedish Application No. 0003681-4, filed Oct. 12, 2000.

BACKGROUND OF INVENTION

1. Technical Field

The present invention relates to safety devices. More specifically, the invention relates to a device for pretensioning a safety belt web joined to a reel mechanism in a vehicle.

2. Background Information

Belt pretensioners are typically used to take up slack in motor vehicle safety belts, e.g., in a collision, between the web windings on the spool of the reel mechanism. At the same time, pretensioners tension up the web against the passenger's body in order to prevent, as much as possible, sliding under the belt or jerking back and forth, resulting in whiplash. It is known that the heavier the person, the higher the pretensioning force required for eliminating slack in the belt. Further, pretensioning which is too forceful can injure a small, light person.

Various devices and methods for adapting the pretensioning force to the weight of the passenger are known. For example, DE-OS 38 17 942 teaches two different solutions, both based on controlling pressure in a cylinder chamber at expansion by the drive gas formed at detonation, whereby the pressure for a lighter person is lower than that for a heavier person. In both solutions, a mechanical device found in the seat is utilized. This device reacts to pressing down the seat cushion. In one case, the volume of the cylinder chamber is controlled by the mechanical device displacing a movable wall in the chamber. If the person is heavy, the wall is set so that the volume will be small. If the person is light, the volume is increased so that the force on the person will be less. In the latter case, a valve slide is controlled relative to a number of evacuation openings from the cylinder chamber so that gas in the chamber is evacuated earlier the lighter the person is. In the first case, the weight adaptation of the pretensioning is infinitely variable, while in the second case it is effected in six steps.

DE 296 12 781 U1 teaches a device for weight adaptation of the belt pretensioning in only two steps. Here, a piston-cylinder device is used with two propulsion charges, both of which are set off if the person on the seat is heavy. If the person is light, only one of the propulsion charges is set off.

In the above known solutions, the piston-cylinder devices are pulling, i.e., the starting position is with the piston rod out of the cylinder. Consequently, the expansion volume for the propulsion charges will be situated on the piston rod side of the piston. Therefore, during expansion the piston rod is drawn into the cylinder.

With the above solutions, complete sealing between the piston rod and the opening in the cylinder wall is difficult to achieve. Therefore, leakage of propellant gas is practically unavoidable. Accordingly, there is a need for a pretensioner that avoids the problem of propellant gas leakage.

SUMMARY OF INVENTION

The pretensioner of the present invention includes a cylinder and a piston displaceable in the cylinder and having a piston rod. The piston rod is joined to one side of the piston and extends through an opening in one end wall of the cylinder. The pretensioner further includes a motion-transmitting element acting between the piston rod and a reel mechanism. Upon displacement of the piston in one direction, the element achieves rotation of the reel mechanism in the winding-up direction of the belt web. The pretensioner further includes both a pyrotechnic charge that, when detonated, causes a pressure increase in a cylinder chamber between the piston and a cylinder end wall for displacement of the piston in one direction, and a controller for controlling the pressure in the cylinder chamber depending on the weight of the person held in by the belt.

One purpose of the present invention is to achieve a device of the type described above that makes possible secure precision adaptation of the pretensioning to the weight of the passenger. An additional purpose of the invention is to achieve a device which eliminates the risk of propellant gas leaking out between the piston rod and the cylinder opening through which the piston rod extends.

This is achieved according to the invention by virtue of the fact that the cylinder chamber is delimited between the side of the piston opposite to the piston rod and the second end wall of the cylinder. Further, the motion-transmitting element is arranged to rotate the reel mechanism in the winding-up direction of the belt web when the piston is displaced in the projection direction of the piston rod. The cylinder chamber has an outlet that communicates with a spill valve, which can be set between various degrees of opening and a completely closed position.

By rotating the reel mechanism in the winding-up direction of the belt, thereby using a pushing instead of a pulling movement of the piston rod, the expansion chamber is placed on that side of the piston which does not have any through-hole for the piston rod. This eliminates one source of leakage for the propellant gas. By combining this arrangement with a spill valve that can be set at a completely closed position, the piston-cylinder device can be blocked in the pretensioned position.

In a preferred further development of the device according to the invention, this possibility is utilized in combination with a positional sensor coupled to the control unit, or "roll-over sensor". This sensor senses if the vehicle is upside-down, thereby providing a signal to the control unit to close the spill valve, thus blocking the device in the pretensioned position so that the passenger is held securely against the seat and will not risk hitting his head against the vehicle ceiling.

In a further development of the device according to the invention, the motion-transmitting element is joined to and partially wound up on a drum. This drum is solidly joined to a ring gear of a planetary gear set, so disposed and coupled to the reel mechanism that the gear ratio between the ring gear and the reel mechanism is 1:1 when the ring gear rotates in the winding-up direction of the belt web, and is geared up upon rotation in the opposite direction so that winding up of a certain length of the motion-transmitting element on the drum of the ring gear corresponds to a several times longer feeding-out of the web from the reel mechanism.

In previously known designs, the force-limiting function is achieved by plastic deformation of a torsion element in the reel mechanism. This function occurs subsequent to pretensioning upon reeling out of the belt due to the load caused by vehicle retardation from the passenger's body against the belt. In practical embodiments, the feed-out length of the belt is, for design reasons, limited to approximately 300 mm. By utilizing a planetary gear set between the motion-transmitting element and the reel mechanism, the feed-out length can be increased by at least fifty percent without any problem.

BRIEF DESCRIPTION OF DRAWINGS

The invention will now be described in more detail with reference to examples shown in the accompanying drawings, where FIG. 1a shows a schematic longitudinal section through one embodiment of a piston-cylinder device with a valve and a motion-transmitting element according to the invention, and FIG. 1b shows an enlargement of the valve in FIG. 1a with associated means for controlling the valve, FIG. 3a shows a partial enlargement of the planetary gear set in FIG. 2 with associated blocking means in the pretensioning position, FIG. 3b shows a schematic side view of the gear set in FIG. 3a, FIG. 4a shows a partial enlargement of the planetary gear set in FIG. 2 with associated blocking means in the force-limiting position, FIG. 4b shows a schematic side view of the gear set in FIG. 4a, FIG. 5 shows a schematic longitudinal section through a second embodiment of a planetary gear set.

DETAILED DESCRIPTION

Figure 2:
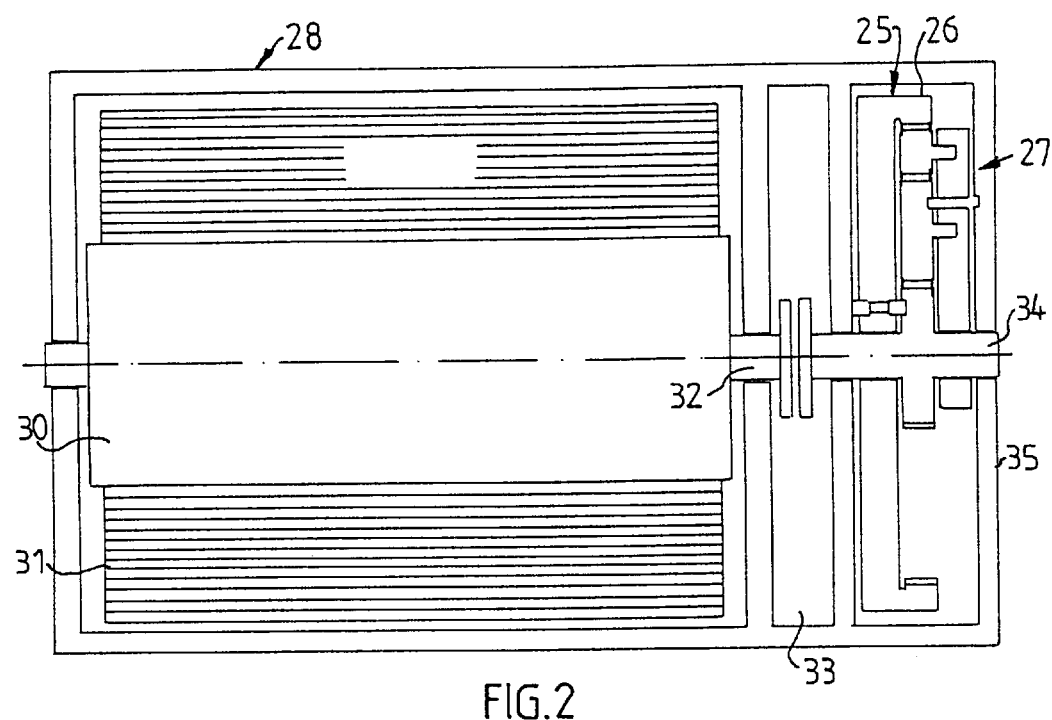
FIG. 2 shows a schematic longitudinal section through a reel mechanism with a first embodiment of a planetary gear set.

In FIG. 1a, reference 1 designates a piston-cylinder device cylinder 2 and a piston 3 displaceable in the cylinder. The piston 3 is joined to a piston rod 4, which extends through an opening 5 in one end wall 6 of the cylinder 2. The end wall also has a vent or ventilation opening 7. The opposite end wall 8 of the cylinder 2 and the piston 3 together define an expansion chamber 9 in which a pyrotechnic charge 10 with a detonator (not shown) is placed. The charge 10 is preferably exploded by retardation-sensitive means, which are known per se and therefore not shown in more detail here. The cylinder wall in the area of the expansion chamber 9 is made with an opening 11 leading to a valve device 12. Through this opening 11, propellant gas in the expansion chamber can escape to the environment.

The valve device 12 (illustrated more fully in FIG. 1b) has a valve slide 14 displaceable in a housing 13, joined to a rotatable set screw 15 in a threaded bore 16 in the housing. The set screw 15 is rotatable with the aid of a servomotor 17. The servomotor 17 is controlled by an electronic control unit 18 based upon one or more signals. These signals may include, for example, a signal from a weight-sensitive sensor 19, which in one embodiment can be built in to the weight-bearing portion of the vehicle seat (not shown) for registering the weight of the person sitting in the seat. The signals may further include a signal from a roll-over sensor 20 that senses if the vehicle is about to end up upside-down.

At the end of the piston rod 4 there is a pulley or roller 21. On either side of the cylinder 2 there are at least two additional rollers 22 and 23 over which run a closed cable loop 24. Two portions or parts 24a and 24b of the loop converge into a single portion or cable 25, which is joined to a drum 26 (see, FIGS. 2–5).

The drum 26, via a planetary gear set 27, is arranged to drive a reel mechanism, which is known per se and generally designated 28, as will be described below. By this arrangement of a pushing piston rod instead of a pulling piston rod, one opening in the end wall 8 on the expansion chamber side of the piston 3 is eliminated. Arranging the cable loop 24 around the piston 3 assures that there will be a symmetrical load on the piston rod 4.

Once all passengers are seated and the driver turns the ignition key, the sensors 19 and 20 cooperating with the control unit 18 are activated. The control unit 18, via the servomotor 17, sets the valve slide 14 to a position that is calculated to provide the optimal catch sequence for the occupant. The relationship between the occupant's weight and the size of the valve opening 11 can be either predetermined by tests, and the values stored in the control unit, or can be calculated based upon the sensed weight with the opening 11 adjusted based upon the calculated value. Generally, the higher the weight, the smaller the valve opening. If the roll-over sensor indicates that the vehicle is about to end up upside-down, the control unit 18 closes the valve 12, fixing the reel mechanism 28 in its pretensioning position by blocking the piston 3. The lack of a piston rod opening in the expansion chamber 9 further assures that gas cannot leak out and change the position of the piston.

FIG. 2 illustrates the planetary gear set 27 and the reel mechanism 28. The latter is of a type known per se and has a belt cylinder 30 with a belt web 31 wound up on the cylinder 30. The cylinder 30 has a shaft 32 which, via a web jerk and compartment retardation sensitive retractor mechanism 33 (indicated only schematically here), is joined joined to a shaft 34 of the planetary gear set 27, shown in greater detail in FIGS. 3a, 3b, 4a and 4b. The shaft 34 is rotatably mounted in a housing 35, which can be either solidly joined or made in one piece with the housing in which the belt cylinder shaft 32 is mounted. In this manner, the housing 35 is solidly mounted in the vehicle.

Referring to FIGS. 3a, 3b, 4a and 4b, the planetary gear set shaft 34 carrying a sun gear 36 is illustrated. The sun gear 36 is able to interact with one or more first planet gears 38 carried by a planet carrier 27. The planet gears 38 are able to interact with one or more second planet gears 39 carried by a second planet carrier. The second planet gears 39 are able to interact with a toothed rim 40 on the interior of the drum 26, forming the ring gear of the planetary gear set 27. A first blocker or blocking means in the form of a spring 41 loaded pin 42 in the end wall of the drum is provided. The pin 42 extends into a cavity 43 in the sun gear 36, and thus the ring gear 40 and consequently also the drum can be locked to the sun gear 36. In another embodiment, a further blocking means is provided in the form of a second pin 45 loaded by a snap-spring 44 and disposed in a bore in the planet gear carrier 37. By projecting the pin 45 into a cavity 46 in the housing 35, the planet gear carrier 37 can be locked to the housing.

The starting position is illustrated in FIGS. 3a and 3b. In this position the pin 42 locks the sun gear 36 to the ring gear 40, providing a gear ratio of about 1:1 between the shaft 34 and the drum 26. The pin 42 is kept in position by a cylindrical body 47, which is held in an arcuate groove 48 in the end wall of the drum 26.

In a collision, the retractor mechanism 33 locks together the shaft 32 of the cylinder 30 and the planetary gear set 34 when the charge 10 in the cylinder expansion chamber 9 is detonated. The cable 25, which is joined to and is somewhat wound up on the drum, then turns the drum an angle dependent on the length of stroke of the piston 3 and the diameter of the drum 26. In this manner, the belt web 31 is pretensioned so that the slack of the web windings on the cylinder 30 is taken up and the belt tightened against the occupant, with the tightening sequence determined by the setting of the valve 12.

When the piston 3 has reached its end position in the cylinder 2, the pretensioning is completed. The forces on the belt web then change directions as the occupant loads the belt during the retardation. This also reverses the torque direction in the planetary gear set, thereby initiating the force-limiting stage illustrated in FIGS. 4a and 4b. The shaft 34 with the sun gear 36 begins to rotate in a direction opposite to the original pretensioning direction. The cylindrical body 47, held by friction against the housing 35 under the influence of the spring 41, is displaced in the groove 48 to the position shown in FIG. 4b. The spring 41 can now move the pin 42 out of the cavity 43, as is shown in FIG. 4a. The sun gear 36 can now rotate relative to the drum 26. Torque is transmitted from the sun gear 36 to the planet gears 38, 39 and planet gear carrier 37, prompting an initial relative movement between the first planet gear 38 and the planet gear carrier 37. The pin 45, which during the pretensioning stage was kept with its end inserted into a flanked depression 49 in the first planet gear 38 under the force of the snap-spring 44, is now pressed towards the planet gear carrier 37. The carrier 37 is provided along a circle directly opposite the pin with a plurality of uniformly spaced depressions 46. The snap-spring 44 will snap the opposite end of the pin 45 into one of the depressions 46, locking the planet gear carrier 37 to the housing 35. Thereby, there will be a gear ratio between the shaft 34 of the planetary gear set and its ring gear 40 corresponding to the relationship between the number of teeth on the sun gear 36 and the ring gear 40. A similar ratio is obtained between the return stroke of the piston and the feed-out length of the belt. The force by which this process occurs is determined by the setting of the valve 12 and, thus, adapted to the occupant's weight.

Figure 6:
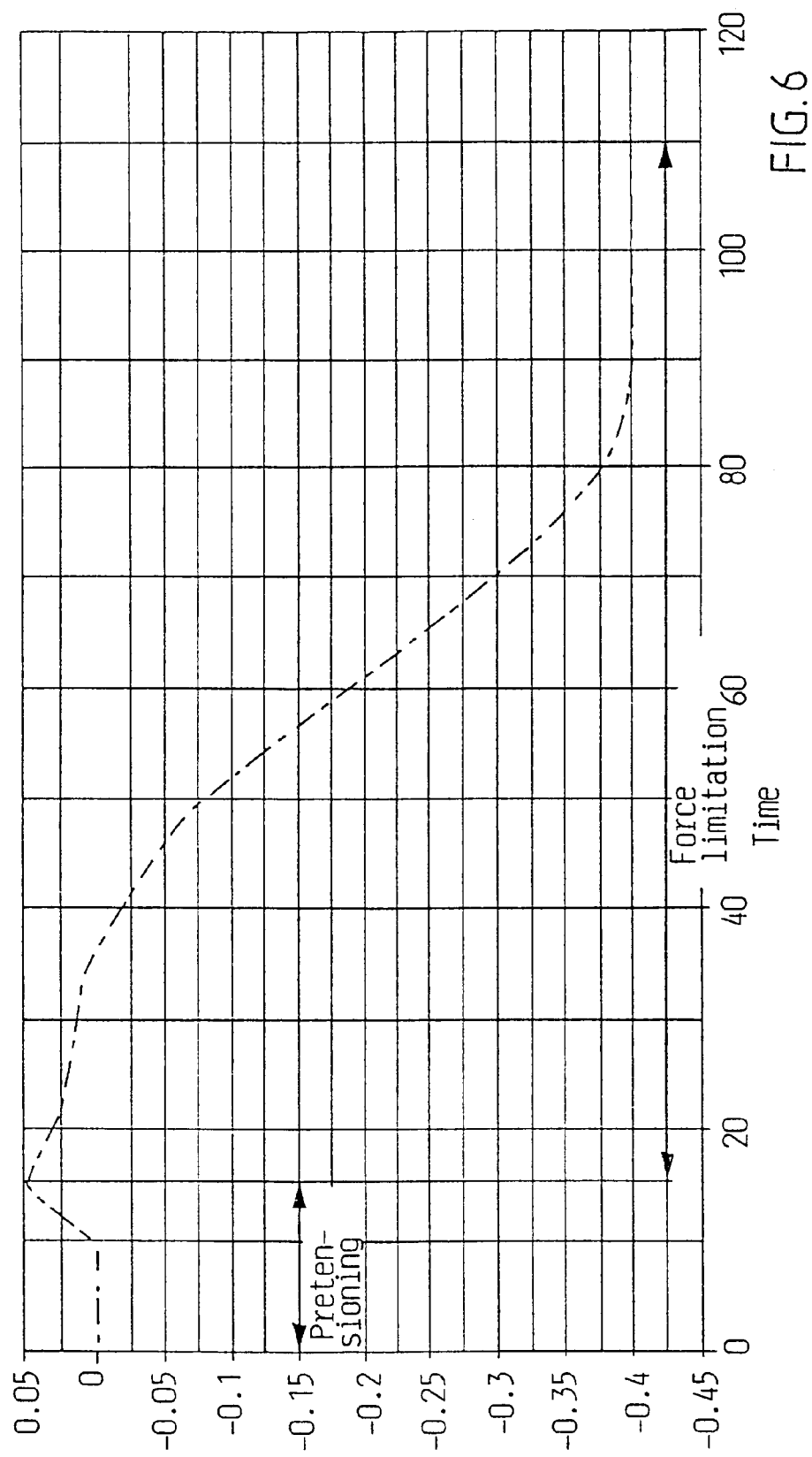
FIG. 6 shows a diagram of the belt displacement as a function of time during the pretensioning and force-limiting stages.

According to one embodiment of the invention, the belt display time is illustrated in FIG. 6. As can be seen from the diagram, during the pretensioning phase the belt is pulled in up to about 5 cm in approximately 15 ms. Thereafter, the belt is fed out during the force-limiting phase about 45 cm in approximately 75 ms. This implies that the entire belt displacement process takes approximately 90 ms, and that the gear ratio in the planetary gear set is approximately 9:1, if the diameter of the drum and the medium diameter of the fed out web windings from the cylinder 30 are approximately equal.

Figure 5:
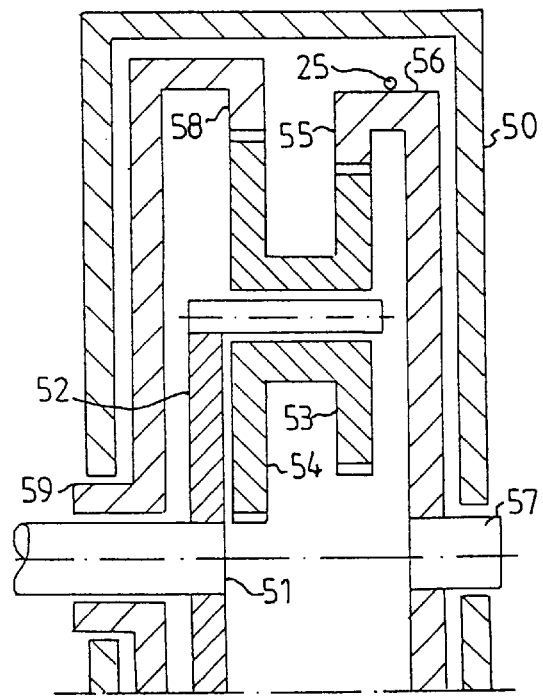

In order to obtain a large gear ratio in the planetary gear set without incurring a drum diameter so large that space problems are created, it is preferable to arrange the gearing in two steps. One example of such a planetary gear set is shown in FIG. 5. The gear set has a housing 50 in which a first shaft 51 is rotatably mounted. The shaft 51 carries a planet gear carrier 52 on which first and second planet gears 53 and 54, solidly joined to each other, are mounted. A first ring gear 55, disposed on the inside of a drum 56 joined to the cable 25, is joined to a second shaft 57 mounted in the housing. The first ring gear 55 is able to engage the first planet gears 53. A second ring gear 58 is able to engage the second planet gears 54 and is joined to a sleeve 59 mounted concentrically in the housing with the first shaft 51. The shaft 51 is connectable to the belt cylinder shaft 32 with the aid of a belt jerk and passenger compartment retardation-sensitive retractor mechanism (not shown in more detail here).

With the aid of a blocker or blocking means (not shown in more detail here), for example, one-way clutches, saw tooth blocking mechanisms or snap-locks of a type known per se, the first shaft 51 can be locked during the pretensioning phase relative to the second shaft 57 to establish a gear ratio of about 1:1. During the force-limiting phase, the second ring gear 58 can be locked to the housing 50 while the shafts 51 and 57 are released relative to each other, thus providing a high gear ratio between the shafts 51 and 57.

The present invention makes possible a substantially accurate adaptation of the catching phase to the weight of the occupant, both during the belt pretensioning phase and during the force-limiting phase during the subsequent belt feed-out. By having a long belt feed-out, it is possible to optimize the force-limiting phase. Finally, the arrangement makes possible a roll-over function by virtue of the fact that the valve can be closed after the pretensioning phase so that the occupant is held securely in his seat.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. A device for pretensioning a safety belt web joined to a reel mechanism in a vehicle, said device comprising:

a cylinder, a piston displaceable in the cylinder and having a piston rod, the piston rod joined to one side of the piston and extending through an opening in one end wall of the cylinder, a motion-transmitting element acting between the piston rod and the reel mechanism, the element achieving rotations of the reel mechanism in the winding-up direction of the belt web upon displacement of the piston in one direction, a cylinder chamber having a pyrotechnic charge, the charge being able to cause, when detonated, a pressure increase in the cylinder chamber between the piston and a cylinder wall for displacement of the piston in one direction, and a controller for controlling the pressure in the cylinder chamber depending on the weight of a person held in by the belt, wherein the cylinder chamber is delimited between the side of the piston opposite to the piston rod and the second end wall of the cylinder, and wherein the motion-transmitting element is arranged to rotate the reel mechanism in the winding-up direction of the belt web when the piston is displaced in the projection direction of the piston rod, said cylinder chamber further comprising an outlet for communicating with a spill valve, said spill valve able to be set between various degrees of opening and a completely closed position.

2. The device according to claim 1, wherein the spill valve is continuously adjustable between various degrees of opening and a closed position.

3. The device according to claim 2, wherein the spill valve further comprises a valve element able to be set by a servo unit controlled by a control unit as a function of signals from a sensor, the sensor sensing the weight of the occupant.

4. The device according to claim 3, wherein the control unit is coordinated with a positional sensor for sensing the position of the vehicle, and wherein the control unit is arranged to close the spill valve at a signal from the positional sensor able to indicate that the vehicle is about to end up upside-down.

5. The device according to claim 1, wherein the piston rod engages an elongated flexible motion-transmitting element having portions running over one or more pulleys on either side of the cylinder, said portions converging at a distance from the second end wall of the cylinder.

6. The device according to claim 1, wherein the motion-transmitting element is joined to and partially wound up on a drum solidly joined to a ring gear of a planetary gear set, the gear set being disposed and coupled to the reel mechanism so that the gear ratio between the ring gear and the reel mechanism is about 1:1 when the ring gear rotates in the winding-up direction of the belt web and is geared up upon rotation in the opposite direction, and wherein winding up of a certain length of the motion-transmitting element on the drum of the ring gear corresponds to a several times longer feeding-out of the web from the reel mechanism.

7. The device according to claim 6, the inside of the drum further comprising:

a ring gear of a planetary gear set, the planetary gear set having a sun gear with a shaft able to be coupled together with a shaft in the reel mechanism, and blocking means able to, upon rotation of the drum in the winding-up direction of the reel mechanism, lock the drum and the sun gear together and, upon rotation in the opposite direction, release the sun gear from the drum and block the planet gear carrier of the planetary gear set against rotation.

8. The device according to claim 6, the inside of the drum further comprising:

a first ring gear engageable with first planet gears on a planetary gear carrier able to be coupled together with a shaft in the reel mechanism, second planet gears on the planetary gear carrier solidly joined to the first planet gears and able to engage a second ring gear, and blocking means able to, upon rotation of the drum in the winding-up direction of the reel mechanism, lock the drum and the planetary gear carrier together and, upon rotation in the opposite direction, release the drum from the planetary gear carrier and block the second ring gear against rotation.

* * * * *